J. D. CURTIS.
WHEELBARROW.
APPLICATION FILED NOV. 14, 1912.
1,134,258.
Patented Apr. 6, 1915
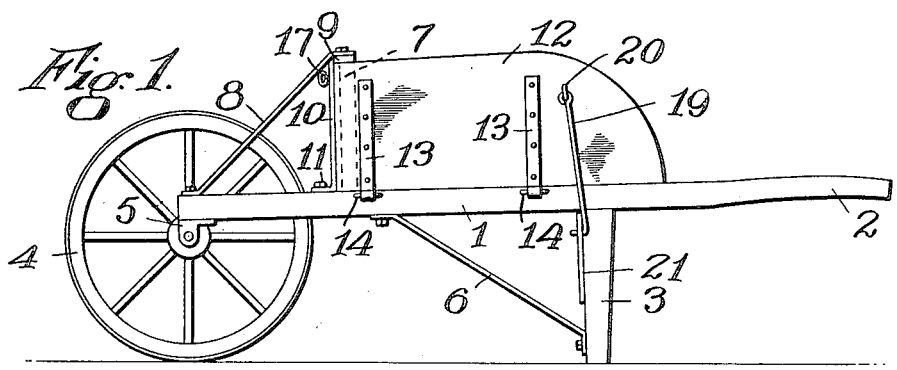
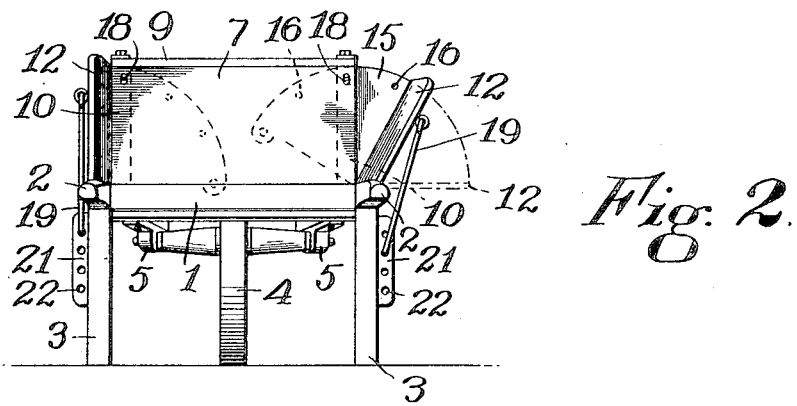
Witnesses.
R. D. Tolman.
Penelope Comberbach.
Inventor
John D. Curtis.
By Ralph E. Atherton.
Attorney

UNITED STATES PATENT OFFICE.

JOHN D. CURTIS, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

WHEELBARROW.

1,134,258.      Specification of Letters Patent.      Patented Apr. 6, 1915.

Application filed November 14, 1912. Serial No. 731,250.

*To all whom it may concern:*

Be it known that I, JOHN D. CURTIS, a citizen of the United States, residing at Worcester, in the county of Worcester and Commonwealth of Massachusetts, have invented a new and useful Improvement in Wheelbarrows, of which the following, together with the accompanying drawing, is a specification.

My invention relates to wheelbarrows and more particularly to that class of wheelbarrows in which the sides thereof may be tipped outwardly and supported in different positions for the purpose of varying the capacity, or for the purpose of adjusting the shape of the inside of the wheelbarrow more perfectly to that of a load to be carried thereby.

An object of the invention is to provide a wheelbarrow having outwardly tipping sides with improved means for supporting such sides in various adjusted positions for the purposes indicated.

Further objects and advantages will appear from the following description taken in connection with the accompanying drawing, in which—

Figure 1 is a side elevation of a wheelbarrow constructed in accordance with my invention, and Fig. 2 is a rear elevation of the wheelbarrow shown in Fig. 1.

Like reference characters refer to similar parts in both figures.

The wheelbarrow shown in the drawing includes an ordinary frame 1 having the usual handles 2 and legs 3 at the rear thereof, and a supporting wheel 4 carried in suitable bearings 5 at the forward end thereof. The legs 3 are held firmly in position by the braces 6. Above the frame and immediately back of the supporting wheel 4 is a dashboard 7 supported by the braces 8. The upper edge of this dashboard consists of a strip of material 9 extending forwardly slightly beyond the front face of the dashboard. In front of each end of the dashboard and spaced slightly therefrom is a flat bar 10 having its lower end firmly secured to the frame 1 by a bolt 11, or other suitable securing means, and having its upper end held against the front edge of the strip 9 by the adjacent brace 8, or otherwise.

The two sides of the wheelbarrow and the supporting means therefor are exactly similar in construction and a description of one side and its supporting means will, therefore, be sufficient to make clear the construction of both. The side 12 is pivoted to the corresponding edge of the frame 1 by strap irons 13, terminating at their lower ends in eyes which pivotally engage suitable staples or loops 14 rigidly attached to the frame. At the forward edge of the side 12 is a quadrant 15 extending inwardly at a right angle, or thereabout, to the side and in position to enter the space between the front face of the dashboard 7 and the bar 10. Along the curved upper and inner edge of the quadrant 15 are provided a number of small openings 16, any one of which may be engaged by a pin 17 passing through alined openings 18 in the bar 10 and dashboard 7, the openings 16 and 18 all being equidistant from the axis about which the side 12 and quadrant 15 rotate.

It is clear that the side 12 may be held in a vertical position, as shown at the left in Fig. 2, by bringing the opening 16 nearest the side into alinement with the openings 18 and passing the pin 17 through the openings. It is also clear that, by bringing the opening 16 farthest from the side 12 into register with the openings 18 and passing the pin 17 through these openings, the side 12 will be held in a substantially horizontal position, as shown in dotted lines in Fig. 2, such adjustment being often desirable when the wheelbarrow is to be used for carrying boards, sticks of wood, or other objects which are so long or large as to extend sidewise beyond the sides of the frame 1.

The quadrant 15 is useful not only to support the side 12 in various adjusted positions, but also to close the space between the forward edge of the side 12 and the adjacent end of the dashboard 7 to prevent material being carried in the wheelbarrow from falling through this space. The quadrant 15, of course, supports the side 12 at the forward end only and, when means is not provided for also supporting the rear end of the side, any pressure against the side, caused by the load in the wheelbarrow pressing thereagainst, will tend to bend or warp the side out of shape and also to loosen and break the fastenings securing the side to the wheelbarrow. To overcome this result, the rear end of the side 12 is supported by a rod 19. The upper end of this rod 19 is formed into an eye which engages a second eye 20 rigidly secured to the side 12 toward the upper rear portion thereof. These two eyes form a universal joint so that the rod 19 may be moved into any desired position with relation to the side 12.

A plate 21 is secured in substantially vertical position to the leg 3 of the wheelbarrow under the side 12 so as to extend outwardly in position to support the lower end of the rod 19. A series of openings 22 in this plate 21 is provided to receive the lower end of the rod 19 which is arranged at a right angle, or thereabout, to the main portion of the rod so as to assume proper position to enter the openings 22. The eye 20, when the wheelbarrow is resting normally upon a horizontal surface, is located slightly forward of the plate 21, so that the lower end of the rod 19 will tend to remain in any one of the openings 22 in which it may have been placed, and it is clear that this tendency will be increased when the rear end of the wheelbarrow is raised in the usual manner. The openings 16 in the quadrant 15 and the openings 22 in the plate 21 are so related that, when any particular opening 16 is engaged by the pin 17, there will be a corresponding opening 22 in proper position to receive the lower end of the rod 19.

It will be seen that the improved means which have been provided for adjustably supporting the sides of the wheelbarrow are simple in construction, may be quickly and easily adjusted to any desired position, and are compact so as not to interfere to any extent with the use of the wheelbarrow; and, above all, these means afford an effective support for the sides of the wheelbarrow so that they cannot be easily bent or broken while in use.

While I have described in detail one form of my invention for the purpose of explaining the principle thereof, I do not wish to be limited to the details shown and described, as various changes may be made without departing from the spirit of the invention; but Having described my invention, what I claim as new and desire to secure by Letters Patent is:

1. A wheelbarrow including a frame, a side pivotally attached to said frame, said side having an extension at an angle thereto providing a closure for the front end of the body as said side is tipped outwardly, means for retaining said extension in various positions of adjustment with respect to said frame, and means for supporting the other end of said side in positions corresponding to the adjusted positions of said extension.

2. A wheelbarrow including a frame, a side, the side being pivotally attached to the frame to allow the side to be tipped outwardly, means for supporting the forward portion of the side in various adjusted positions, a rod pivotally attached at one end to the rear portion of the side, the other end of the rod being bent at an angle to the main portion of the rod, and a plate having a substantially vertical series of openings to receive the bent end of the rod, whereby the rod and the rear portion of the side may be supported in correspondingly adjusted position.

3. A wheelbarrow including a frame, a side, the side being pivotally attached to the frame to allow the side to be tipped outwardly, means for supporting the forward portion of the side in adjusted position, a rod pivotally attached at one end to the rear portion of the side, and a member having a series of openings to receive the lower end of the rod whereby the member may support the rear portion of the side in adjusted position, the end of the rod attached to the side being attached out of vertical alinement with the openings to cause the lower end of the rod to tend to remain in the openings.

4. A wheelbarrow including a frame, a side, the side being pivotally attached to the frame to allow the side to be tipped outwardly, and a rod pivotally attached at one end to the side, there being a series of openings to receive the lower end of the rod whereby the side may be supported in various adjusted positions, the end of the rod attached to the side being attached out of vertical alinement with the openings to cause the lower end of the rod to tend to remain in the openings.

Dated this twelfth day of November 1912.

JOHN D. CURTIS.

Witnesses:
PENELOPE COMBERBACH,
NELLIE WHALEN.

Copies of this patent may be obtained for five cents each, by addressing the "Commissioner of Patents, Washington, D. C."